United States Patent
R. et al.

(10) Patent No.: US 11,509,534 B2
(45) Date of Patent: Nov. 22, 2022

(54) COLLECTION OF ERROR PACKET INFORMATION FOR NETWORK POLICY ENFORCEMENT

(71) Applicant: Juniper Networks, Inc., Sunnyvale, CA (US)

(72) Inventors: Vivek R., Bangalore (IN); Reji Thomas, Bangalore (IN); Jimmy Jose, Hosur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 162 days.

(21) Appl. No.: 16/661,694

(22) Filed: Oct. 23, 2019

(65) Prior Publication Data

US 2021/0126830 A1    Apr. 29, 2021

(51) Int. Cl.
*H04L 41/0893*    (2022.01)
*G06F 9/54*    (2006.01)
*H04L 43/0823*    (2022.01)
*H04L 9/40*    (2022.01)

(52) U.S. Cl.
CPC .......... *H04L 41/0893* (2013.01); *G06F 9/547* (2013.01); *H04L 43/0847* (2013.01); *H04L 63/1425* (2013.01)

(58) Field of Classification Search
CPC ............. H04L 41/0893; H04L 43/0847; H04L 63/1425; H04L 47/32; H04L 1/203; H04L 43/0829; H04L 63/1408; G06F 9/547; G06F 11/0703
See application file for complete search history.

(56) References Cited

U.S. PATENT DOCUMENTS

| | | | |
|---|---|---|---|
| 6,690,650 B1 * | 2/2004 | Stener | H04L 43/16 370/241 |
| 7,386,417 B1 | 6/2008 | Bao et al. | |
| 9,386,034 B2 | 7/2016 | Cochenour | |
| 2003/0110419 A1 * | 6/2003 | Banerjee | H04L 43/12 714/43 |
| 2003/0233463 A1 * | 12/2003 | O'Connor | H04L 69/22 709/230 |
| 2004/0098478 A1 * | 5/2004 | Koetke | H04L 51/34 709/224 |
| 2009/0222709 A1 * | 9/2009 | Lin | H04L 1/0057 714/776 |

(Continued)

FOREIGN PATENT DOCUMENTS

EP    3588292 A1    1/2020

OTHER PUBLICATIONS

Partial European Search Report for Application No. EP20203125.8, dated Mar. 18, 2021, 13 pages.

(Continued)

*Primary Examiner* — Thai Nguyen
(74) *Attorney, Agent, or Firm* — Harrity & Harrity, LLP

(57) ABSTRACT

A network device may detect an error associated with a packet based on error information being generated from processing the packet at a layer of a network stack. The network device may determine, based on detecting the error, metadata associated with the packet. The network device may generate telemetry data to include the metadata. The network device may provide the telemetry data to a network analyzer for policy enforcement.

20 Claims, 9 Drawing Sheets

(56) References Cited

U.S. PATENT DOCUMENTS

| | | | |
|---|---|---|---|
| 2015/0222507 A1* | 8/2015 | Choy | H04L 43/0811 |
| | | | 370/252 |
| 2016/0248795 A1* | 8/2016 | Chien | H04L 61/2007 |
| 2016/0359890 A1* | 12/2016 | Deen | H04L 41/0803 |
| 2016/0373474 A1 | 12/2016 | Sood et al. | |
| 2017/0230410 A1 | 8/2017 | Hassanzadeh et al. | |
| 2017/0302554 A1 | 10/2017 | Chandrasekaran et al. | |
| 2018/0262585 A1 | 9/2018 | Zandi et al. | |

OTHER PUBLICATIONS

Extended European Search Report for Application No. EP20203125.8, dated Jul. 19, 2021, 16 pages.

\* cited by examiner

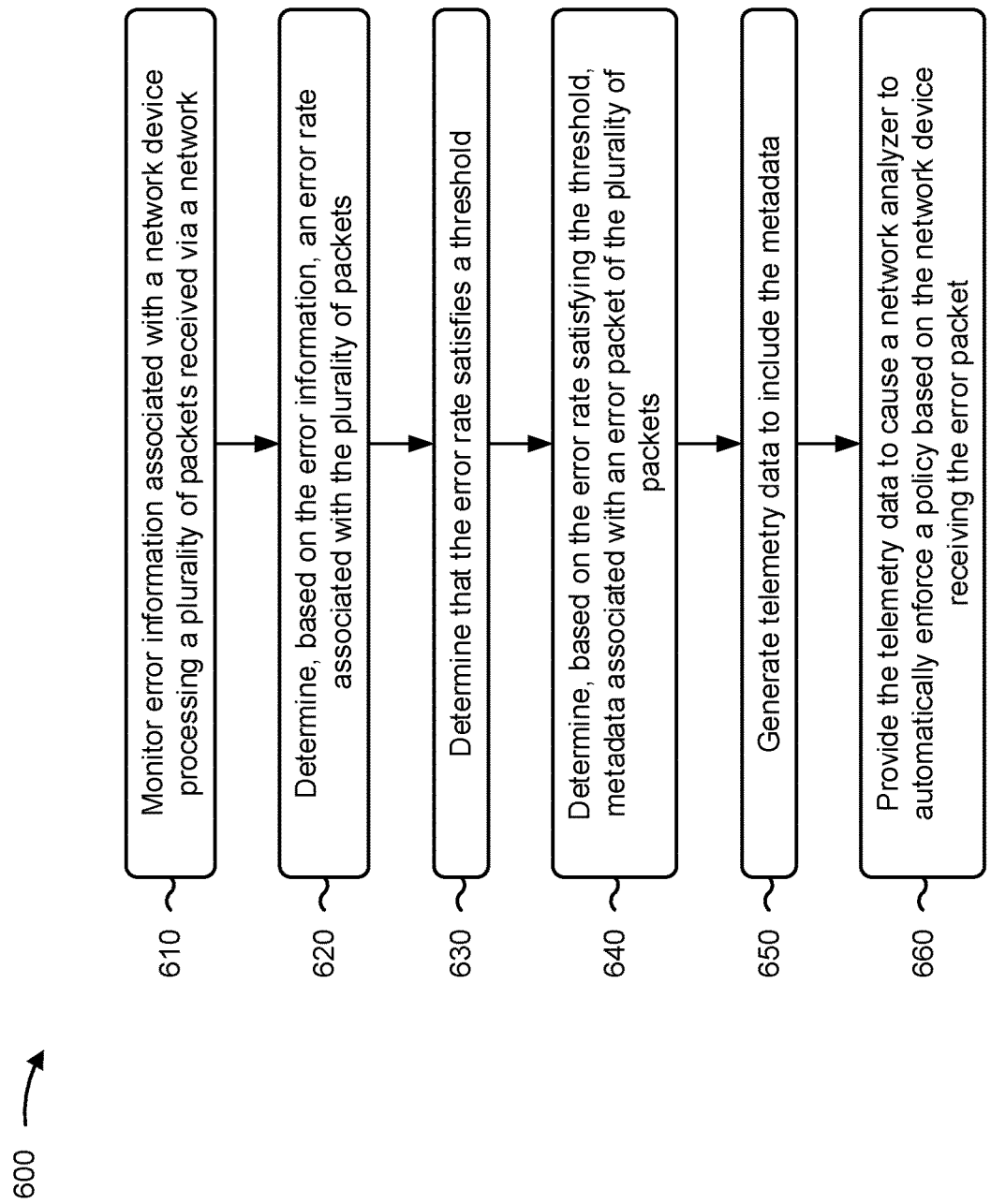

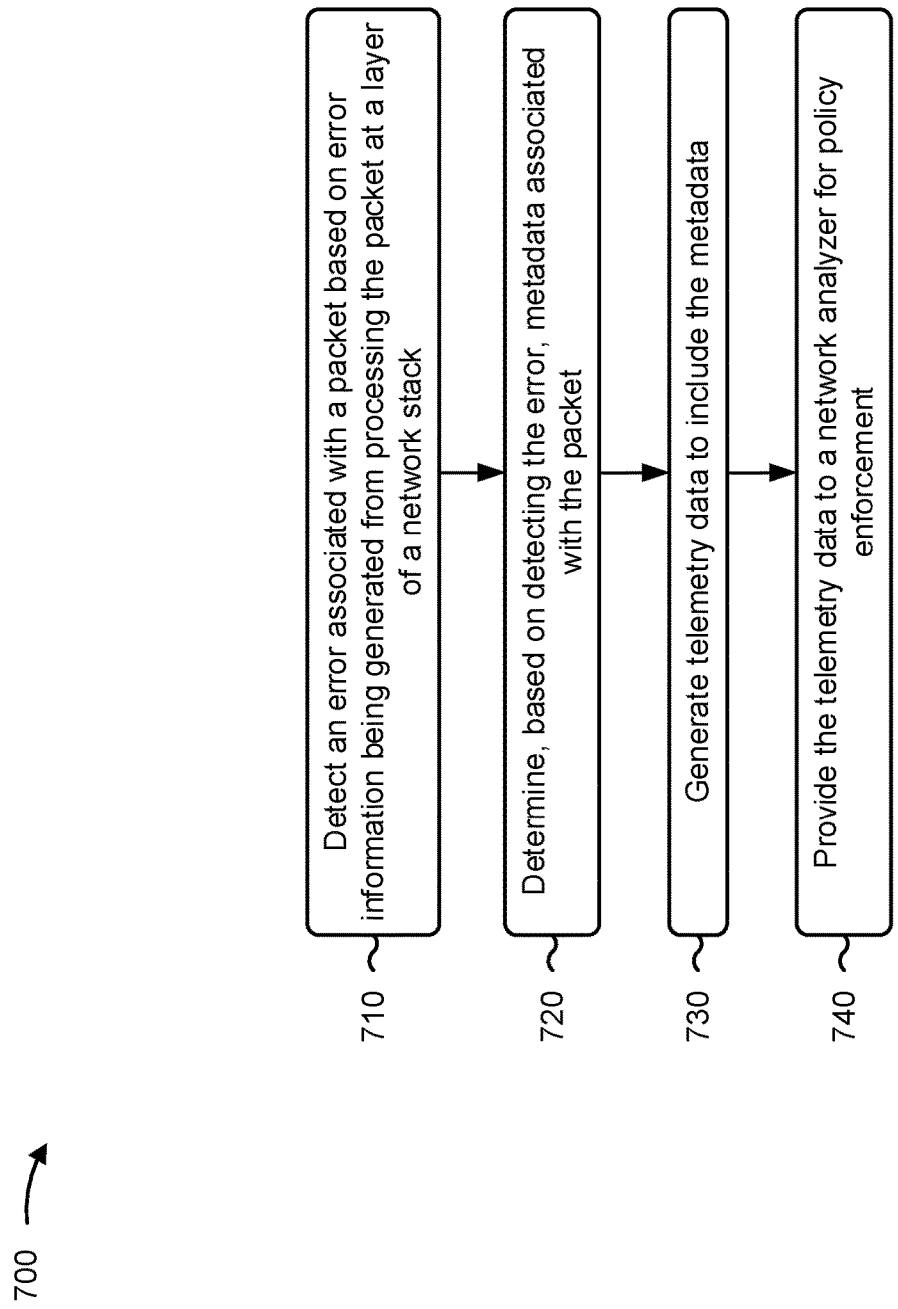

COLLECTION OF ERROR PACKET INFORMATION FOR NETWORK POLICY ENFORCEMENT

BACKGROUND

Telemetry involves recording received telemetry data to a data structure. Typically, telemetry data is received from a remote or inaccessible source and is used for monitoring and analysis. Telemetry data may be relayed using radio, infrared, ultrasonic, GSM, satellite, or cable, depending on the application.

SUMMARY

According to some implementations, a method may include receiving, by a network device, a packet; processing, by the network device, the packet using a network stack; determining, by the network device and based on processing the packet, that the packet is associated with an error; determining, by the network device and based on determining that the packet is associated with the error, metadata associated with the packet; generating, by the network device, telemetry data that includes the metadata; and providing, by the network device, the telemetry data to a network analyzer to permit the network analyzer to enforce a network policy based on the metadata.

According to some implementations, a device may include one or more memories; and one or more processors, communicatively coupled to the one or more memories, configured to: monitor error information associated with a network device processing a plurality of packets received via a network; determine, based on the error information, an error rate associated with the plurality of packets; determine that the error rate satisfies a threshold; determine, based on the error rate satisfying the threshold, metadata associated with an error packet of the plurality of packets; generate telemetry data to include the metadata; and provide the telemetry data to cause a network analyzer to automatically enforce a policy based on the network device receiving the error packet.

According to some implementations, a non-transitory computer-readable medium may store one or more instructions. The one or more instructions, when executed by one or more processors, may cause the one or more processors to: detect an error associated with a packet based on error information being generated from processing the packet at a layer of a network stack; determine, based on detecting the error, metadata associated with the packet; generate telemetry data to include the metadata; and provide the telemetry data to a network analyzer for policy enforcement.

BRIEF DESCRIPTION OF THE DRAWINGS

FIGS. 5-7 are flowcharts of one or more example processes for collecting error packet information for network policy enforcement.

DETAILED DESCRIPTION

Figure 1A:
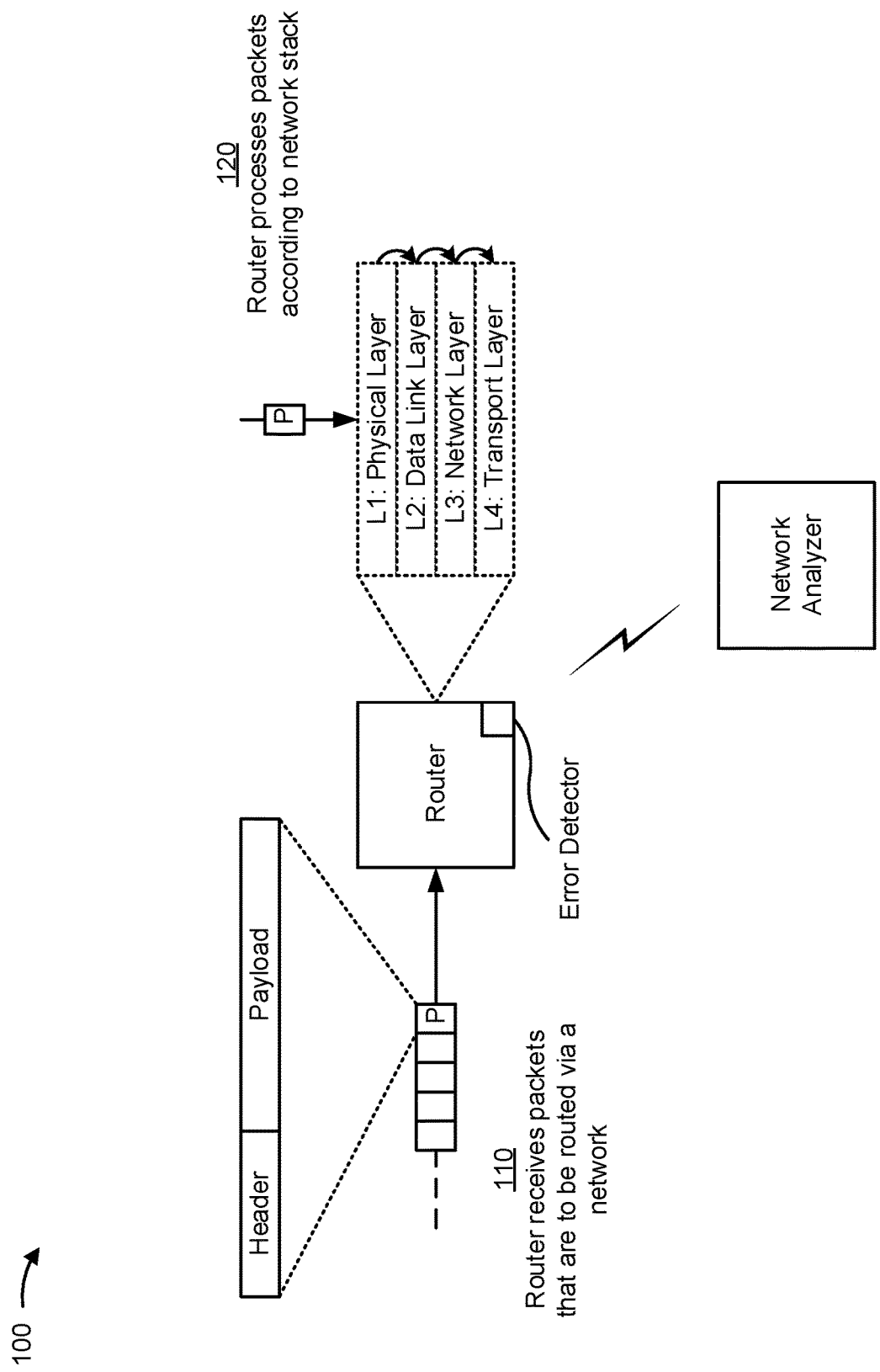
FIGS. 1A-1C are diagrams of one or more example implementations described herein.

The following detailed description of example implementations refers to the accompanying drawings. The same reference numbers in different drawings may identify the same or similar elements.

In some instances, a network device (e.g., a switch, a router, a gateway, and/or the like) processes a packet to determine whether the packet is associated with an error. In such cases, when processing the packet, the packet is traversed through a network stack (or protocol stack). When a layer of the network stack detects that the packet includes or is associated with an error (e.g., may cause an error), the network device drops the packet. In some instances, the network stack is configured to track such occurrences. For example, the network stack may increment a counter to indicate that a packet error occurred. Such information can be provided as telemetry data to a network analyzer to enable the network analyzer to enforce a policy based on the error being detected. However, such telemetry data (or such information included in the telemetry data) does not provide any context associated with the packet, only that an error occurred upon receipt of the packet and/or that the packet was dropped. Therefore, policies enforced by the network analyzer according to such information are enforced without any context associated with the packet and primarily based on the fact that the network device experienced an error and/or dropped the packet.

According to some implementations described herein, a network device is configured to determine and/or provide context associated with a packet that caused or is associated with an error. For example, the network device may detect an error associated with a packet from a network stack processing the packet, determine metadata associated with the packet, generate telemetry data that includes the metadata, and provide the metadata to a network analyzer for policy enforcement. A packet that caused or is associated with an error (which may be referred to herein as an "error packet") may include a packet involved in a malicious attack, a packet that disrupts an operation of a device or network, a packet that includes an error (e.g., a packet this incomplete, unreadable, and/or the like), and/or the like.

Accordingly, relative to previous techniques, the network device may be able to obtain and/or provide context associated with a packet that caused an error, to permit the network analyzer to enforce more granular policies and/or permit detection of sources of the errors and/or malicious attacks. Furthermore, such policies may prevent false positives with respect to dropping packets (e.g., by enabling the network analyzer to address packets being dropped because the packets are erroneously presumed to be erroneous or malicious) and/or assist with preventing such errors and/or malicious attacks by thwarting further attacks. In this way, the network device may conserve computing resources and/or network resources associated with processing packets and/or addressing malicious attacks associated with a network or a device.

Figure 1B:
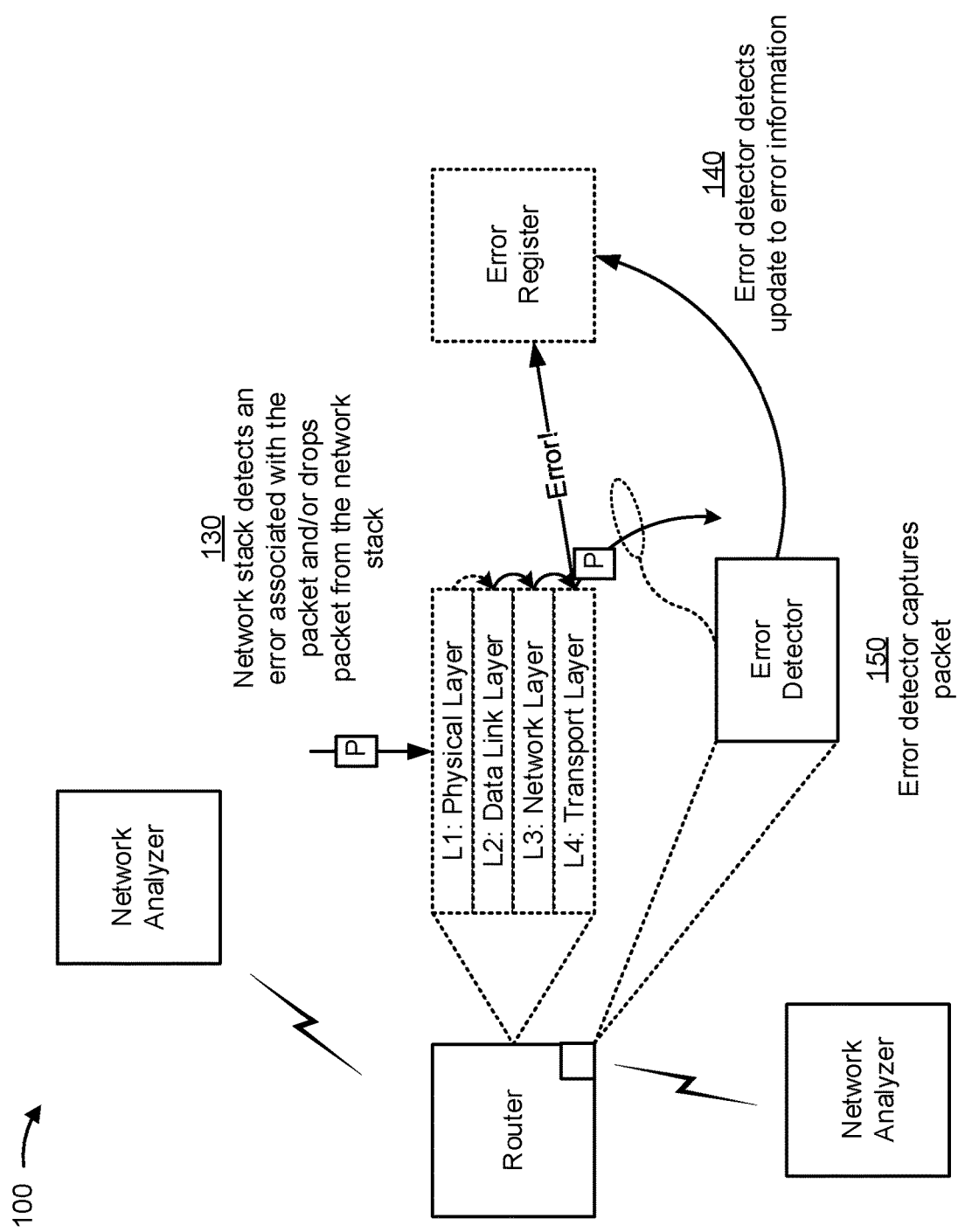
Figure 1C:
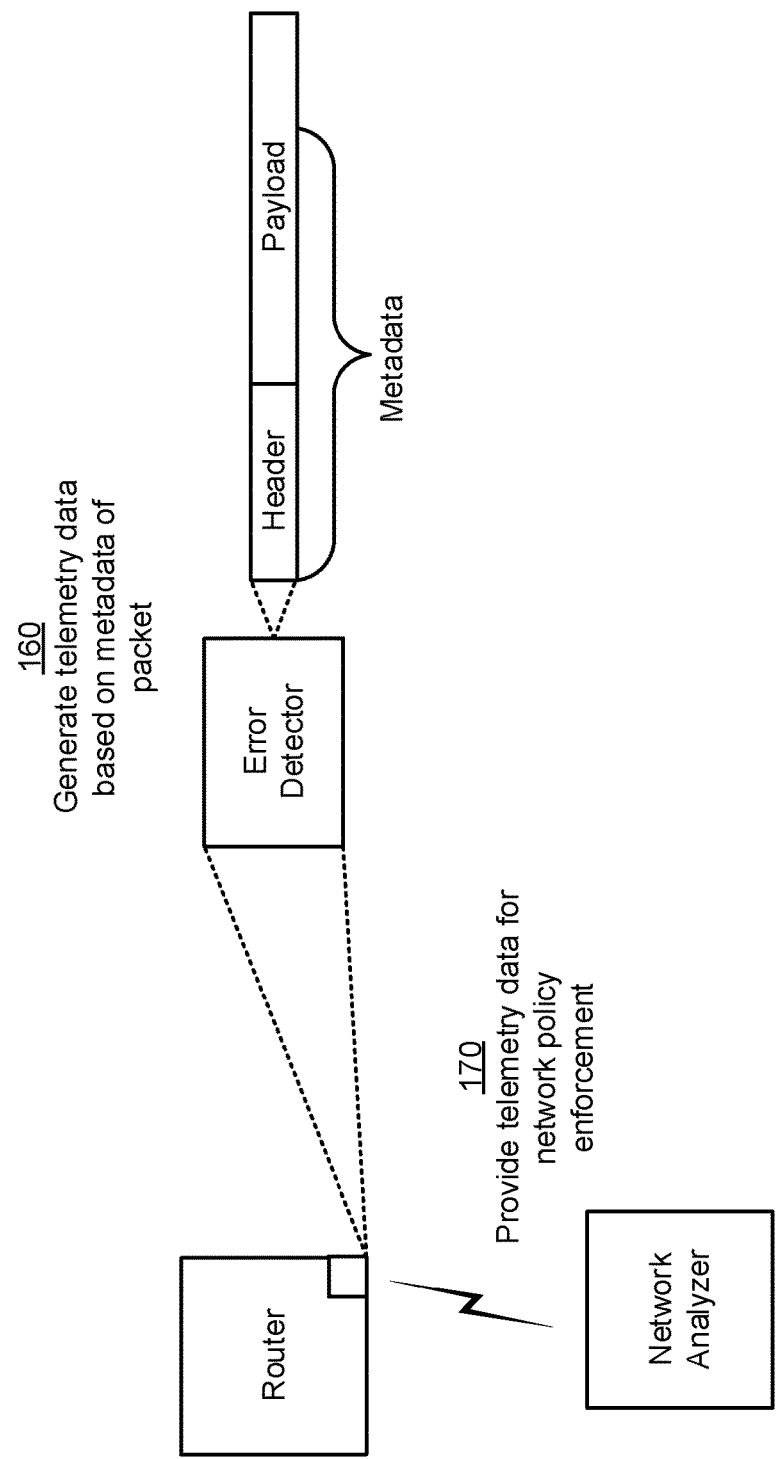

FIGS. 1A-1C are diagrams of an example implementation 100 described herein. Example implementation 100 includes a router with an error detector and a network analyzer. The network analyzer and the router may be associated with a same network. For example, the network analyzer may include one or more network devices that are configured to enforce policies associated with routing traffic through the network via the router and/or any other network devices associated with the network. As described herein, the error detector may detect an error associated with a received packet, determine metadata associated with the packet corresponding to a context of the packet (which may be referred to herein as "packet context"), and provide the metadata as telemetry data (and/or within telemetry data) to the network analyzer, to permit the network analyzer to create and/or enforce policies according to the context of the packet. Although example implementation 100 is described in connection with a router, examples described herein may similarly apply to other types of network devices.

As shown in FIG. 1A, and by reference number 110, the router receives packets that are to be routed via the network. The router may receive the packets via one or more wired or wireless connections of the network. The packets may be received as a stream. In some implementations, the packets are associated with a same set of data (e.g., data of a file, data of an image, data of a message, and/or the like), a same source, and/or the like. Additionally, or alternatively, the packets may be received from different sources and/or may be associated with different sets of data. As shown, a packet "P" (referred to in examples herein as "the packet") may include a header and a payload. The header may include information identifying a source (e.g., an identifier of a source device) of the packet and a destination of the packet (e.g., an identifier of a destination device). The payload may correspond to the data that is being transferred and/or that is to be processed at the destination of the packet. For example, the payload may correspond to data that is to be used in a session (e.g., a communication session, a data exchange, and/or the like) between a source device and a destination device.

As further shown in FIG. 1A, and by reference number 120, the router processes the packet according to a network stack. During processing, the network stack is configured to traverse the packet (and other received packets) through various layers according to various protocols.

The network stack may correspond to an open systems interconnection (OSI) model. For example, the network stack may include a first layer (L1) of the network stack that may be a physical layer for a session associated with the packet, a second layer (L2) of the network stack may be a data link layer for the session, a third layer (L3) may be a network layer for the session, a fourth layer (L4) may be a transport layer for the session, a fifth layer (L5) may be a session layer for the session, a sixth layer (L6) may be a presentation layer for the session, and a seventh layer (L7) may be an application layer for the session.

As shown in example implementation 100, the router may use a network stack that is configured to process the packet through a physical layer, a data link layer, a network layer, and a transport layer. The network stack may be configured to process the packets through the various layers according to any suitable configuration. For example, the network stack may be configured to process a packet at each individual layer to validate the packet according to one or more protocols for that individual layer. If the packet cannot be validated at a particular layer, the packet may be dropped (e.g., removed from memory, overwritten in memory, and/or the like). If the packet is validated at a particular layer, the packet moves on to the next layer until the packet traverses the stack and is forwarded to (or toward) a destination.

In this way, the router may be configured to process one or more packets using a network stack to permit the router to determine whether the packets are associated with an error (or whether the packets are error packets).

As shown in FIG. 1B, and by reference number 130, the network stack detects an error associated with the packet (referred to herein as "the packet") and/or drops the packet from the network stack. For example, as shown, at the transport layer, the network stack may not be able to validate the packet (e.g., due to a security configuration, due to a protocol issue, due to a data formatting issue, and/or the like).

As shown, the network stack may send an error indicator to an error register of the router. The error register may be configured to track and/or monitor errors (e.g., using a counter). Additionally, or alternatively, the error register may be configured to determine and/or calculate statistical information associated with errors, such as an error rate (e.g., a packet error rate (PER)), an error percentage, and/or other types of error information. In some implementations, the error register may track and/or determine security breaches (e.g., malware attacks) and/or other security information according to a configuration of the network stack.

In this way, the network stack may be configured to indicate that an error packet was received and cause the error register to update error information associated with the router to permit the error detector to detect the error.

As further shown in FIG. 1B, and by reference number 140, the error detector detects an update to the error information. For example, based on the network stack indicating that a packet was invalidated according to the transport layer, the error detector may determine that the packet is associated with an error (or is an error packet). More specifically, the error detector may detect that an error counter of the error register was incremented (e.g., indicating that the packet is an error packet). Additionally, or alternatively, the error detector may determine that the packet is determined to be associated with the error based on the network stack indicating that the packet is to be dropped (e.g., based on the packet being flagged or designated as being dropped).

In some implementations, the error detector may be configured to monitor error information in the error register. For example, the error detector may monitor the error information to determine an error rate associated with the router and/or associated with the router receiving and processing a plurality of packets via the network stack. The error rate may correspond to a percentage of dropped packets over a most recently received quantity of packets and/or over a most recent time period. In some implementations, the error detector may compare the error rate to a threshold (e.g., a threshold percentage of dropped packets over a most recently received quantity of packets and/or over a most recent time period). For example, the error rate may be determined to have satisfied the threshold using a filter (e.g., a statistical filter associated with a network stack). Accordingly, the packet of example implementation 100 may be a packet that causes the error rate to satisfy the threshold. In some implementations, the error detector may detect the error using a filter associated with the network stack (e.g., an extended Berkeley Packet Filter (eBPF) and/or other type of filter).

In some implementations, the error detector may be configured to monitor error rates associated with particular types of packets and/or packets that have particular characteristics (e.g., as being from a particular source, as being intended for a particular destination, as having a same or similar payload, as being a same size, as being associated with a same protocol, and/or the like). For example, the error detector may sort error packets according to characteristics of the error packets. In this way, when an error rate associated with a particular type of characteristic satisfies a threshold, the error detector may determine that the characteristic may provide context for the error packets as being a source of an error and/or a characteristic that is to be further examined by the network analyzer for policy enforcement.

In this way, the router, via the error detector, may detect that the packet (or a plurality of packets) are associated with an error, to permit the error detector to capture the packets and/or determine a context of the packets, as described herein.

As further shown in FIG. 1B, and by reference number 150, the error detector captures the packet. For example, based on determining, from the error information in the error register, that the packet is an error packet, the error detect may copy (e.g., read and write) the packet to a temporary register of the error detector. Additionally, or alternatively, the error detector may block and/or prevent the packet from being removed or overwritten. For example, the error detector may remove a designation that the packet is to be dropped and/or a designation that a memory (e.g., a memory utilized by the network stack to process packets) that is storing the packet data is to be erased or overwritten. According to some implementations, the error detector may capture and/or store a plurality of error packets (e.g., a particular quantity of most recently received packets).

In some implementations, after the error detector captures the error packet and/or stores the error packet separately from a memory associated with the network stack, the error detector may permit the error packet to be dropped from the network stack.

In this way, the error detector may capture the error packet to permit the error detector to determine metadata associated with the error packet and provide context of the packet to the network analyzer as telemetry data.

As shown in FIG. 1C, and by reference number 160, the error detector generates telemetry data based on metadata of the packet. For example, the error detector may generate telemetry data that includes metadata associated with the packet. The error detector may generate and/or determine the metadata based on detecting that the received packet is an error packet. As described herein, the metadata may include a source of the packet, a destination of the packet, data from a payload of the packet, and/or the like. Accordingly, the metadata may include information from the header of the packet and/or information from a portion of the payload of the packet to permit some context of the packet to be provided within the telemetry data.

In some implementations, the error detector may determine the metadata that is to be included within the telemetry data based on one or more characteristics of the error packet. For example, the error detector may determine whether to include header information and payload information based on a source of the packet and/or based on a destination of the packet. Additionally, or alternatively, the error detector may determine which metadata to include based on information included in the payload of the packet (e.g., whether information may be associated with a security breach, incomplete data, and/or the like). In some implementations, the error detector may determine which metadata to include based on which layer of the network stack invalidated the packet and/or caused the network stack to indicate an error.

According to some implementations, the metadata may be determined from a sampling of packets associated with errors (e.g., a sampling of a plurality of packets that have a same characteristic as the error packet). For example, if the error detector determines that an error rate associated with a plurality of received packets satisfies a threshold (e.g., indicating that the router is experiencing an unusually high amount of errors), the error detector may sample a plurality of captured (e.g., stored) error packets to determine metadata associated with the plurality of error packets. For example, the metadata may be generated from a sample (e.g., a threshold quantity or a threshold percentage) of the error packets to determine context associated with the error packets. In some implementations, the metadata may be determined from sampling of error packets that have one or more of the same characteristics (e.g., that were received from a same source, that were intended for a same destination, that included a same or similar payload, and/or the like).

According to some implementations, the telemetry data is generated according to a particular protocol. For example, the telemetry data may be generated using a communication protocol (e.g., a remote procedure call (gRPC) protocol) of communications and/or messages between the router and the network analyzer. Accordingly, generated telemetry data that includes the metadata may cause a recipient to determine that the data is to be processed as telemetry data, not as a standard communication.

In this way, the error detector may determine metadata associated with an error packet and generate telemetry data that includes the metadata to permit the error detector to provide the telemetry data to a network analyzer for policy enforcement.

As further shown in FIG. 1C, and by reference number 170, the router provides the telemetry data to the network analyzer for network policy enforcement. The router may provide the telemetry data based on the error detector generating the telemetry data. Additionally, or alternatively, the telemetry data may be sent according to a schedule and/or in response to a request for telemetry data from the network analyzer. In such cases, the error detector and/or the router may be configured to store telemetry data so that metadata associated with a plurality of error packets can be sent in batches.

The router may provide the telemetry data via a gRPC channel configured between the router and the network analyzer. Accordingly, providing the telemetry data may cause and/or permit the network analyzer to automatically determine and/or enforce a network policy for a network of the router based on the metadata (and/or context of the error packet). Using any suitable techniques, the network analyzer may collect and/or store telemetry data that includes context of error packets, monitor the context of error packets for patterns or trends, determine policies based on detected patterns or trends, and deploy and/or enforce the policies on network devices of the network.

In this way, the router (e.g., via the error detector) may obtain context (e.g., from metadata or including the metadata) of one or more error packets processed by a network stack, generate telemetry data associated with the context, and provide the telemetry data to a network analyzer to permit the network analyzer to enforce network policies according to the context of the one more error packets.

Accordingly, as described herein, the network device enables the network analyzer to enforce policies (e.g., automatically) based on context of a packet, rather than merely being based on an occurrence of a packet causing an error. Such policies may permit the network analyzer to prevent the network device from erroneously dropping packets (e.g., if the presumed error packet was determined by the network analyzer to be benign). Additionally, or alternatively, the network device may permit the network analyzer to enforce policies that automatically block packets received from a particular source, packets that include a particular type of data, packets that are being transmitted to a particular destination, packets that are in a particular format, and/or the like.

As indicated above, FIGS. 1A-1C are provided merely as one or more examples. Other examples may differ from what is described with regard to FIGS. 1A-1C.

Figure 2:
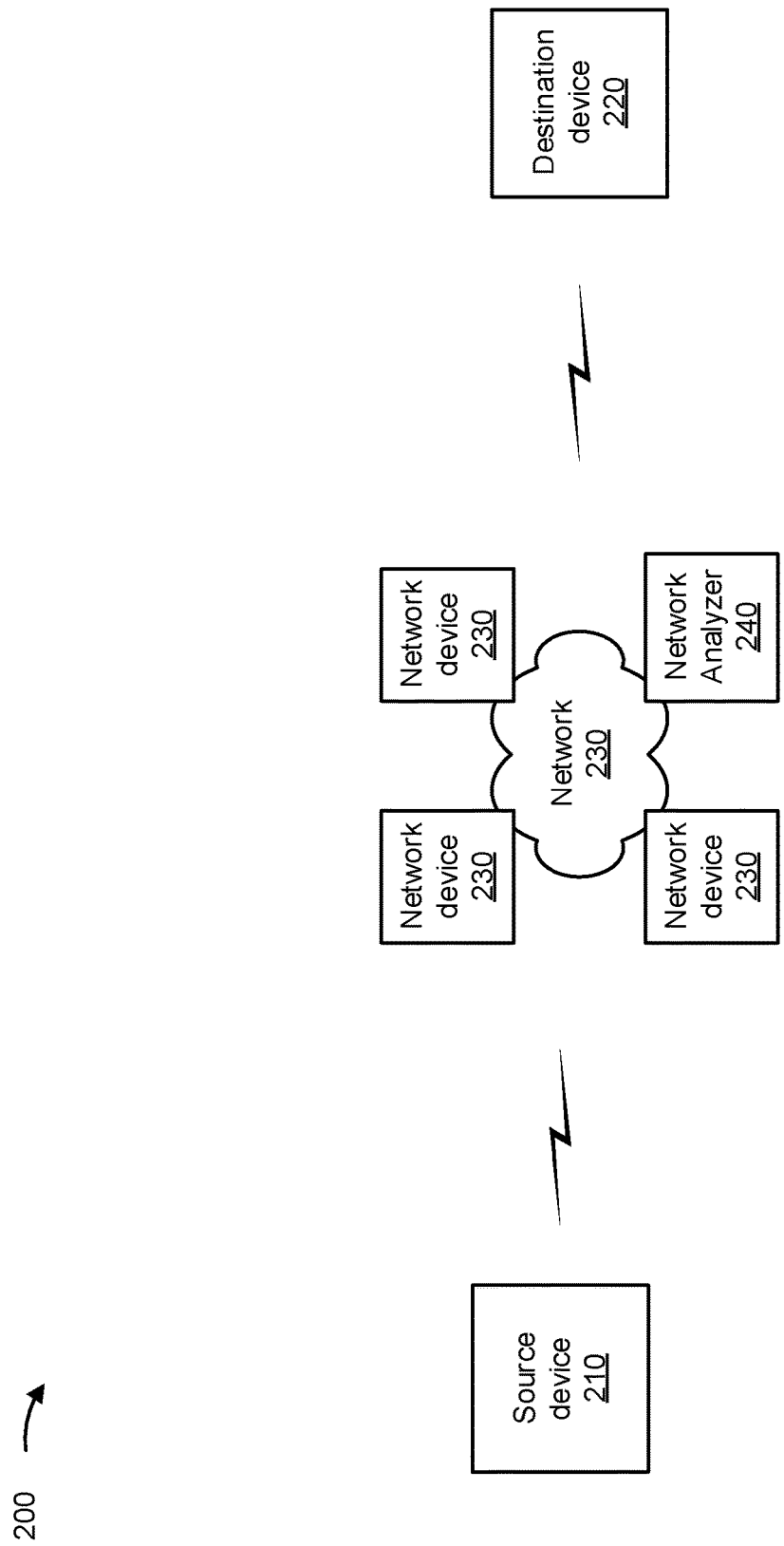
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a source device 210, a destination device 220, a network 230, one or more network devices 240 (referred to herein individually as "network device 240" or collectively as "network devices 240"), and a network analyzer 250. Devices of environment 200 may interconnect via wired connections, wireless connections, or a combination of wired and wireless connections.

Source device 210 and/or destination device 220 may include one or more user devices. For example, source device 210 and/or destination device 220 may include one or more devices capable of receiving, generating, storing, processing, and/or providing network traffic associated with an application and/or a session, as described herein. Source device 210 and/or destination device 220 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, source device 210 and/or destination device 220 may be a cloud-based platform of a cloud computing environment, a web-based platform, an online platform, and/or the like.

Network device 240 includes one or more devices (e.g., one or more traffic transfer devices) capable of processing and/or transferring traffic between endpoint devices (e.g., between source device 210, destination device 220, and/or the like) and/or other networks. For example, network device 240 may include a router, a gateway, a switch, a hub, a bridge, a reverse proxy, a server (e.g., a proxy server), a firewall, a security device, an intrusion detection device, a load balancer, or a similar device.

Network analyzer 250 may include one or more devices for enforcing a policy (e.g., a traffic policy, a routing policy, a security policy, and/or the like) of network 230. For example, network analyzer 250 may include or be associated with a server (e.g., a proxy server), a firewall, a security device, an intrusion detection device, a load balancer, or other security device, of a network that may be used to allow or block network traffic associated with the network. For example, the network device may use a set of policies to block or allow network traffic sent to the network, network traffic sent from the network, and/or network traffic sent within the network. In some implementations, network analyzer 250 may be a physical device implemented within a housing, such as a chassis. In some implementations, network analyzer 250 may be a virtual device implemented by one or more computer devices of a cloud computing environment or a data center.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
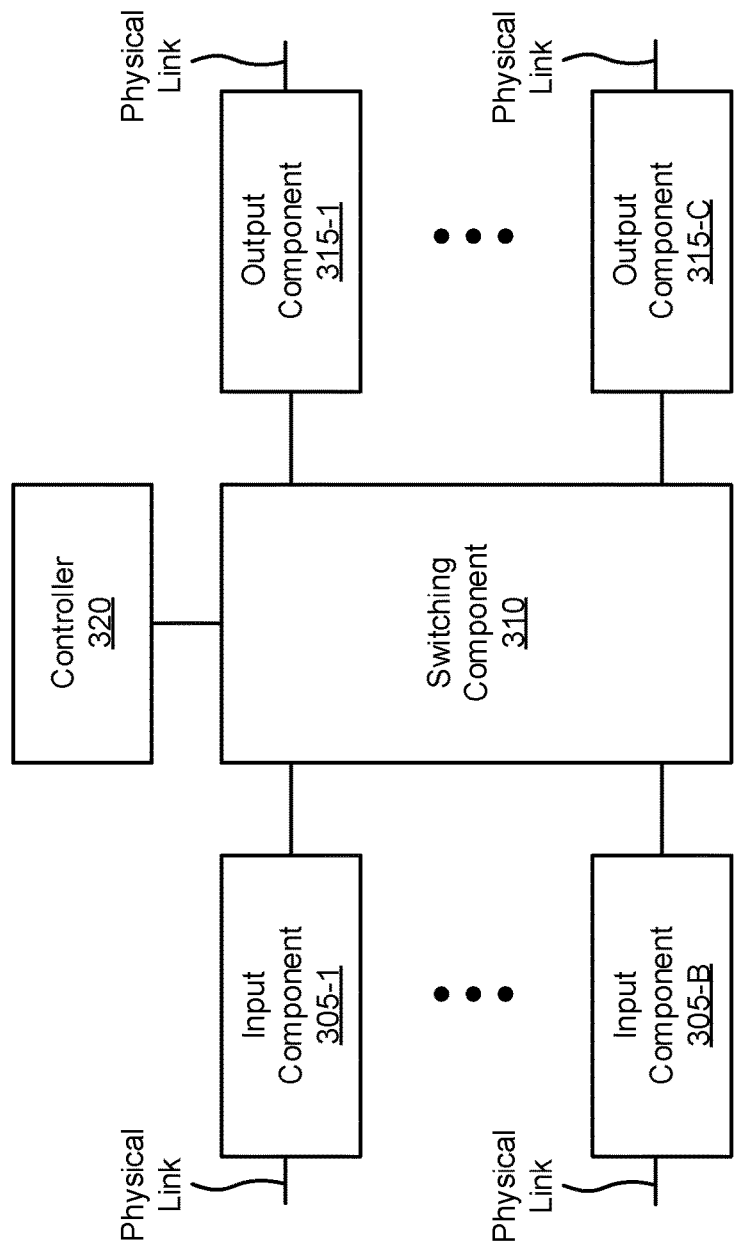
FIGS. 3 and 4 are diagrams of example components of one or more devices of FIG. 2.

FIG. 3 is a diagram of example components of a device 300. Device 300 may correspond to network device 240. In some implementations, network device 240 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor. In some implementations, controller 320 may include one or more processors that can be programmed to perform a function. Controller 320 may correspond to and/or implement the error detector of example implementation 100.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
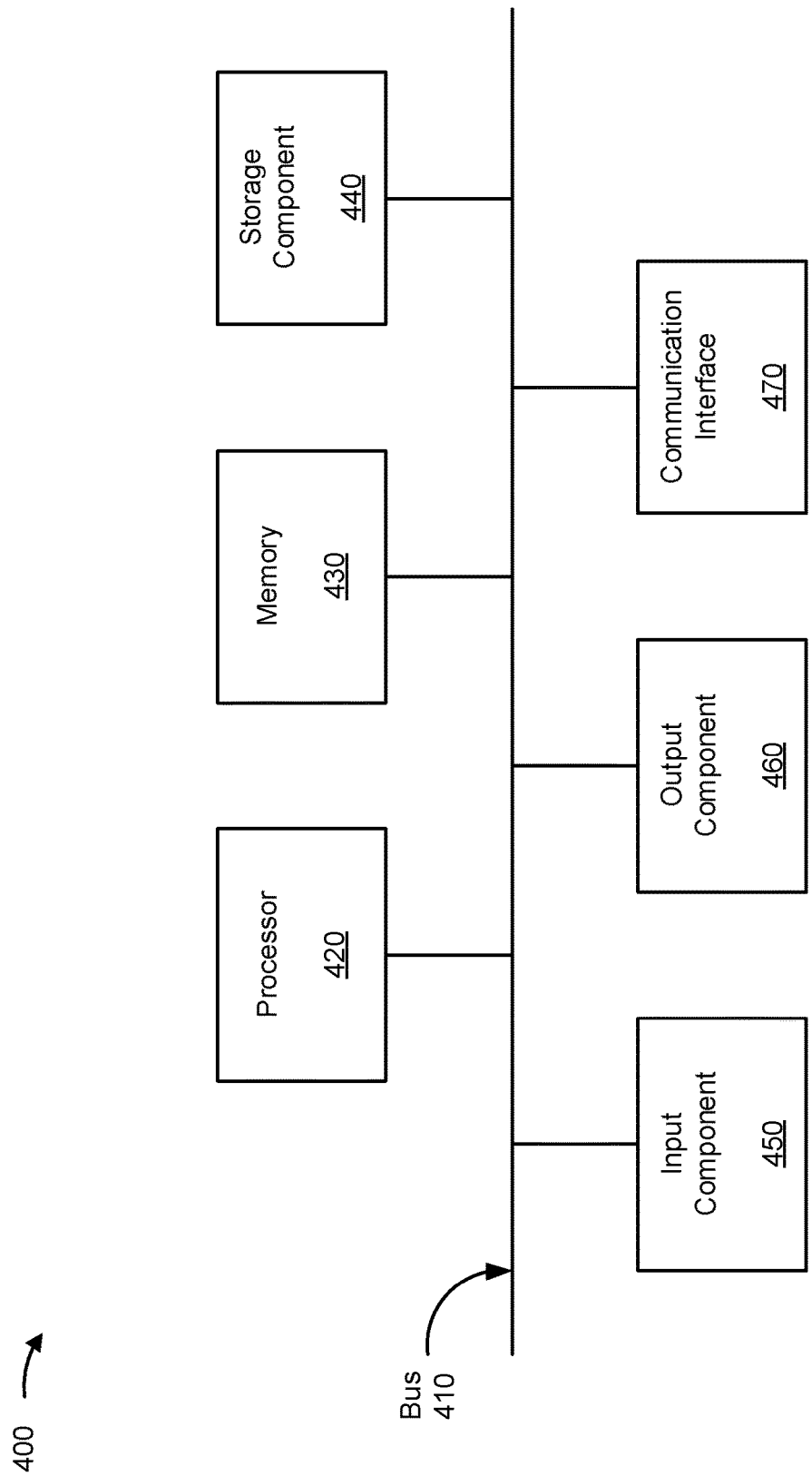

FIG. 4 is a diagram of example components of a device 400. Device 400 may correspond to source device 210, destination device 220, network device 240, network analyzer 250, and/or device 300. In some implementations, source device 210, destination device 220, network device 240 and/or network analyzer 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive. Storage component 440 may be used to store and/or implement the security policy database of example implementation 100.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
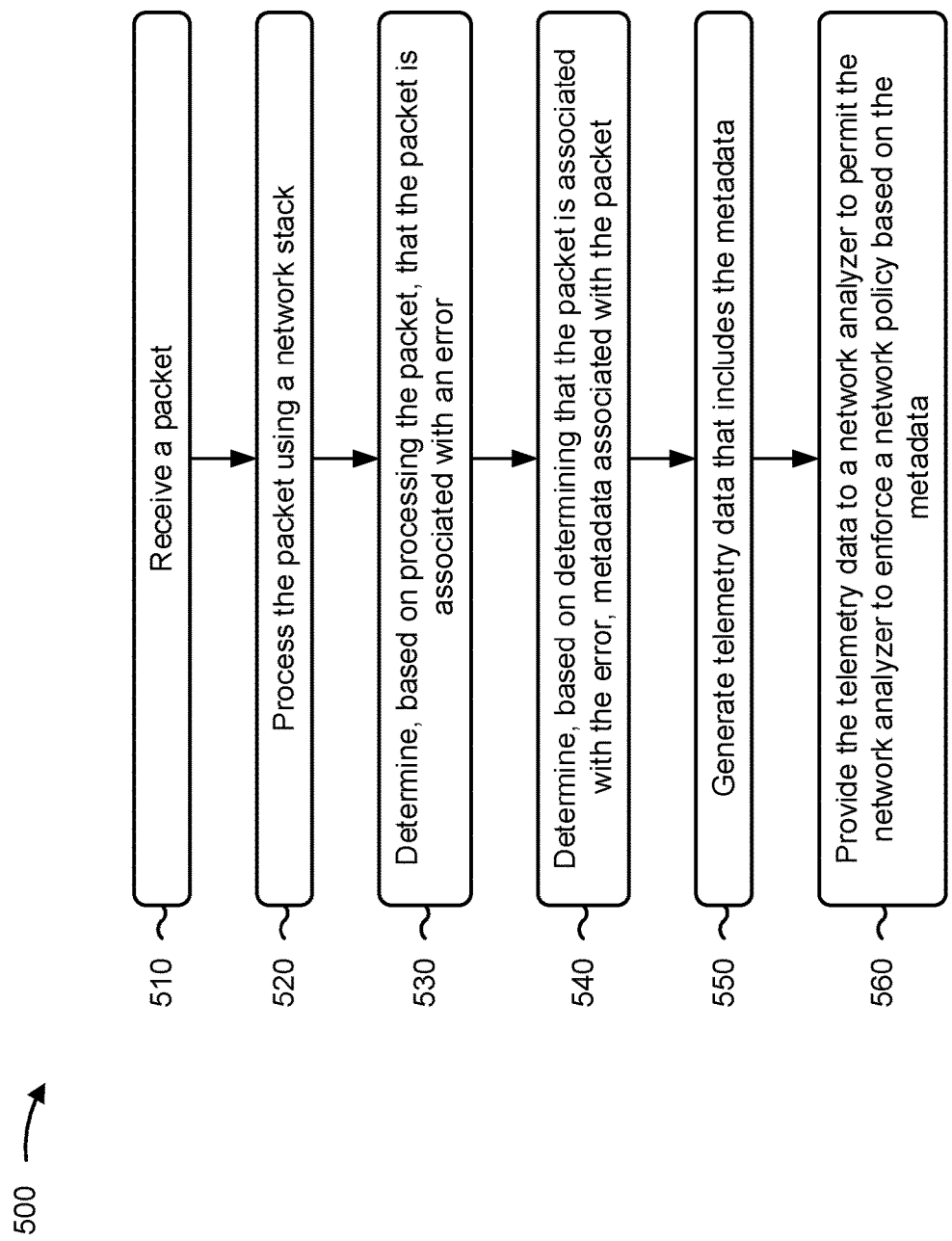

FIG. 5 is a flowchart of an example process 500 for collecting error packet information for network policy enforcement. In some implementations, one or more process blocks of FIG. 5 may be performed by a network device (e.g., network device 240). In some implementations, one or more process blocks of FIG. 5 may be performed by another device or a group of devices separate from or including the network device, such as network analyzer 250, and/or the like.

As shown in FIG. 5, process 500 may include receiving a packet (block 510). For example, the network device (e.g., using input component 305, switching component 310, output component 315, controller 320, processor 420, memory 430, storage component 440, input component 450, output component 460, communication interface 470 and/or the like) may receive a packet, as described above.

As further shown in FIG. 5, process 500 may include processing the packet using a network stack (block 520). For example, the network device (e.g., using input component 305, switching component 310, output component 315, controller 320, processor 420, memory 430, storage component 440, input component 450, output component 460, communication interface 470 and/or the like) may process the packet using a network stack, as described above.

As further shown in FIG. 5, process 500 may include determining, based on processing the packet, that the packet is associated with an error (block 530). For example, the network device (e.g., using input component 305, switching component 310, output component 315, controller 320, processor 420, memory 430, storage component 440, input component 450, output component 460, communication interface 470 and/or the like) may determine, based on processing the packet, that the packet is associated with an error, as described above.

As further shown in FIG. 5, process 500 may include determining, based on determining that the packet is associated with the error, metadata associated with the packet (block 540). For example, the network device (e.g., using input component 305, switching component 310, output component 315, controller 320, processor 420, memory 430, storage component 440, input component 450, output component 460, communication interface 470 and/or the like) may determine, based on determining that the packet is associated with the error, metadata associated with the packet, as described above.

As further shown in FIG. 5, process 500 may include generating telemetry data that includes the metadata (block 550). For example, the network device (e.g., using input component 305, switching component 310, output component 315, controller 320, processor 420, memory 430, storage component 440, input component 450, output component 460, communication interface 470 and/or the like) may generate telemetry data that includes the metadata, as described above.

As further shown in FIG. 5, process 500 may include providing the telemetry data to a network analyzer to permit the network analyzer to enforce a network policy based on the metadata (block 560). For example, the network device (e.g., using input component 305, switching component 310, output component 315, controller 320, processor 420, memory 430, storage component 440, input component 450, output component 460, communication interface 470 and/or the like) may provide the telemetry data to a network analyzer to permit the network analyzer to enforce a network policy based on the metadata, as described above.

Process 500 may include additional implementations, such as any single implementation or any combination of implementations described below and/or in connection with one or more other processes described elsewhere herein.

In a first implementation, the packet is determined to be associated with the error based on the network stack indicating that the packet is to be dropped, and the method further comprises: capturing the packet, extracting the metadata from the packet, and enabling the packet to be dropped. In a second implementation, alone or in combination with the first implementation, the packet is determined to be associated with an error based on an error counter being incremented as the packet is processed through a layer of the network stack. In a third implementation, alone or in combination with one or more of the first and second implementations, the metadata is determined based on the packet being processed through a particular layer of the network stack.

In a fourth implementation, alone or in combination with one or more of the first through third implementations, the metadata is determined using a filter of the network stack that is triggered based on the packet being dropped by the network stack. In a fifth implementation, alone or in combination with one or more of the first through fourth implementations, the error causes an error rate associated with the network stack processing a plurality of packets to satisfy a threshold, and the metadata is determined based on the error causing the error rate to satisfy the threshold. In a sixth implementation, alone or in combination with one or more of the first through fifth implementations, the telemetry data is provided to the network analyzer via a remote procedure call channel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for collecting error packet information for network policy enforcement. In some implementations, one or more process blocks of FIG. 6 may be performed by a network device (e.g., network device 240). In some implementations, one or more process blocks of FIG. 6 may be performed by another device or a group of devices separate from or including the network device, such as network analyzer 250, and/or the like.

As shown in FIG. 6, process 600 may include monitoring error information associated with the network device processing a plurality of packets received via a network (block 610). For example, the network device (e.g., using input component 305, switching component 310, output component 315, controller 320, processor 420, memory 430, storage component 440, input component 450, output component 460, communication interface 470 and/or the like) may monitor error information associated with the network device processing a plurality of packets received via a network, as described above.

As further shown in FIG. 6, process 600 may include determining, based on the error information, an error rate associated with the plurality of packets (block 620). For example, the network device (e.g., using input component 305, switching component 310, output component 315, controller 320, processor 420, memory 430, storage component 440, input component 450, output component 460, communication interface 470 and/or the like) may determine, based on the error information, an error rate associated with the plurality of packets, as described above.

As further shown in FIG. 6, process 600 may include determining that the error rate satisfies a threshold (block 630). For example, the network device (e.g., using input component 305, switching component 310, output component 315, controller 320, processor 420, memory 430, storage component 440, input component 450, output component 460, communication interface 470 and/or the like) may determine that the error rate satisfies a threshold, as described above.

As further shown in FIG. 6, process 600 may include determining, based on the error rate satisfying the threshold, metadata associated with an error packet of the plurality of packets (block 640). For example, the network device (e.g., using input component 305, switching component 310, output component 315, controller 320, processor 420, memory 430, storage component 440, input component 450, output component 460, communication interface 470 and/or the like) may determine, based on the error rate satisfying the threshold, metadata associated with an error packet of the plurality of packets, as described above.

As further shown in FIG. 6, process 600 may include generating telemetry data to include the metadata (block 650). For example, the network device (e.g., using input component 305, switching component 310, output component 315, controller 320, processor 420, memory 430, storage component 440, input component 450, output component 460, communication interface 470 and/or the like) may generate telemetry data to include the metadata, as described above.

As further shown in FIG. 6, process 600 may include providing the telemetry data to cause a network analyzer to automatically enforce a policy based on the network device receiving the error packet (block 660). For example, the network device (e.g., using input component 305, switching component 310, output component 315, controller 320, processor 420, memory 430, storage component 440, input component 450, output component 460, communication interface 470 and/or the like) may provide the telemetry data to cause a network analyzer to automatically enforce a policy based on the network device receiving the error packet, as described above.

Process 600 may include additional implementations, such as any single implementation or any combination of implementations described below and/or in connection with one or more other processes described elsewhere herein.

In a first implementation, the metadata associated with the error packet is determined based on sampling a plurality of error packets to identify the error packet within the plurality of error packets, and the plurality of error packets caused the error rate to satisfy the threshold.

In a second implementation, alone or in combination with the first implementation, the error packet is captured based on the error information indicating that the error packet is associated with an error. In a third implementation, alone or in combination with one or more of the first and second implementations, the error information is generated according to a network stack that is processing the plurality of packets. In a fourth implementation, alone or in combination with one or more of the first through third implementations, the error rate is determined using a statistical filter associated with a network stack that is processing the plurality of packets.

In a fifth implementation, alone or in combination with one or more of the first through fourth implementations, the error rate is associated with the plurality of packets including a plurality of error packets that have a same characteristic, the error packet is one of the plurality of packets and has the same characteristic, and the metadata includes information identifying the same characteristic. In a sixth implementation, alone or in combination with one or more of the first through fifth implementations, the telemetry data causes the network analyzer to automatically enforce the policy based on the telemetry data being received via a remote procedure call channel between the network analyzer and the network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 for collecting error packet information for network policy enforcement. In some implementations, one or more process blocks of FIG. 7 may be performed by a network device (e.g., network device 240). In some implementations, one or more process blocks of FIG. 7 may be performed by another device or a group of devices separate from or including the network device, such as network analyzer 250, and/or the like.

As shown in FIG. 7, process 700 may include detecting an error associated with a packet, based on error information being generated from processing the packet at a layer of a network stack. For example, the network device (e.g., using input component 305, switching component 310, output component 315, controller 320, processor 420, memory 430, storage component 440, input component 450, output component 460, communication interface 470 and/or the like) may detect an error associated with a packet, based on error information being generated from processing the packet at a layer of a network stack, as described above.

As shown in FIG. 7, process 700 may include determining, based on detecting the error, metadata associated with the packet (block 720). For example, the network device (e.g., using input component 305, switching component 310, output component 315, controller 320, processor 420, memory 430, storage component 440, input component 450, output component 460, communication interface 470 and/or the like) may determine, based on detecting the error, metadata associated with the packet, as described above.

As further shown in FIG. 7, process 700 may include generating telemetry data to include the metadata (block 730). For example, the network device (e.g., using input component 305, switching component 310, output component 315, controller 320, processor 420, memory 430, storage component 440, input component 450, output component 460, communication interface 470 and/or the like) may generate telemetry data to include the metadata, as described above.

As further shown in FIG. 7, process 700 may include providing the telemetry data to a network analyzer for policy enforcement (block 740). For example, the network device (e.g., using input component 305, switching component 310, output component 315, controller 320, processor 420, memory 430, storage component 440, input component 450, output component 460, communication interface 470 and/or the like) may provide the telemetry data to a network analyzer for policy enforcement, as described above.

Process 700 may include additional implementations, such as any single implementation or any combination of implementations described below and/or in connection with one or more other processes described elsewhere herein.

In a first implementation, the layer of the network stack corresponds to at least one of: a network layer, or a transport layer. In a second implementation, alone or in combination with the first implementation, the packet is determined to be associated with an error based on an error counter being incremented as the packet is processed through the layer of the network stack.

In a third implementation, alone or in combination with one or more of the first and second implementations, the metadata includes information from a header of the packet. In a fourth implementation, alone or in combination with one or more of the first through third implementations, the metadata includes a header of the packet and at least a portion of a payload of the packet. In a fifth implementation, alone or in combination with one or more of the first through fourth implementations, the metadata is determined based on information in a header of the packet.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a packet;
   processing, by the network device, the packet through a first layer, of multiple layers, of a network protocol stack;
   processing, by the network device, the packet through a second layer, of the multiple layers, of the network protocol stack based on the packet not being invalidated at the first layer;
   determining, by the network device, that the packet is associated with an error based on determining that the packet was invalidated at the second layer,
      wherein the error causes an error rate, associated with the network protocol stack processing a plurality of packets, to satisfy a threshold;
   determining, by the network device and based on determining that the packet is associated with the error, metadata associated with the packet,
      wherein the metadata is determined based on the error causing the error rate to satisfy the threshold;
   generating, by the network device, telemetry data that includes the metadata; and
   providing, by the network device, the telemetry data to a network analyzer to permit the network analyzer to enforce a network policy based on the metadata.

2. The method of claim 1, wherein the packet is determined to be associated with the error based on the network protocol stack indicating that the packet is to be dropped, and
   wherein the method further comprises:
      capturing the packet;
      extracting the metadata from the packet; and
      enabling the packet to be dropped.

3. The method of claim 1, wherein the packet is determined to be associated with the error based on an error counter being incremented as the packet is processed through the second layer.

4. The method of claim 1, wherein the metadata is determined based on the packet being processed through a particular layer, of the multiple layers, of the network protocol stack.

5. The method of claim 1, wherein the metadata is determined using a filter of the network protocol stack that is triggered based on the packet being dropped by the network protocol stack.

6. The method of claim 1, wherein the telemetry data is provided to the network analyzer via a remote procedure call channel.

7. The method of claim 1, wherein the error rate is determined using a statistical filter.

8. A device, comprising:
one or more memories; and
one or more processors communicatively coupled to the one or more memories, configured to:
monitor error information associated with a network device processing a plurality of packets received via a network,
wherein the error information is generated according to a network protocol stack that is processing the plurality of packets through each layer, of a plurality of layers, of the network protocol stack to validate the plurality of packets according to one or more protocols for that individual layer until an error is determined at a layer of the plurality of layers;
determine, based on the error information, an error rate associated with the plurality of packets;
determine that the error rate satisfies a threshold;
determine, based on the error rate satisfying the threshold, metadata associated with an error packet of the plurality of packets;
generate telemetry data to include the metadata; and
provide the telemetry data to cause a network analyzer to automatically enforce a policy based on the network device receiving the error packet.

9. The device of claim 8, wherein the metadata associated with the error packet is determined based on sampling a plurality of error packets from the plurality of packets to identify the error packet within the plurality of error packets,
wherein the plurality of error packets caused the error rate to satisfy the threshold.

10. The device of claim 8, wherein the error packet is captured based on the error information indicating that the error packet is associated with the error.

11. The device of claim 8, wherein the error rate is determined using a statistical filter.

12. The device of claim 8, wherein the error rate is associated with the plurality of packets including a plurality of error packets that have a same characteristic,
wherein the error packet is one of the plurality of packets and has the same characteristic, and
wherein the metadata includes information identifying the same characteristic.

13. The device of claim 8, wherein the one or more processors, when determining that the error rate satisfies the threshold, are to:
monitor the error rate associated with a packet that has a particular characteristic, and
determine that the error rate associated with a particular type of characteristic satisfies the threshold.

14. The device of claim 8, wherein the one or more processors, when determining the metadata, are to:
determine the metadata associated with the error packet corresponding to a context of the error packet.

15. A non-transitory computer-readable medium storing instructions, the instructions comprising:
one or more instructions that, when executed by one or more processors of a network device, cause the one or more processors to:
process a packet through a second layer of multiple layers of a network protocol stack based on the packet not being invalidated at a first layer of the multiple layers of the network protocol stack;
detect an error associated with the packet based on error information being generated from processing the packet at the second layer and based on determining the packet was invalidated at the second layer,
wherein the error causes an error rate, associated with the network protocol stack processing a plurality of packets, to satisfy a threshold;
determine, based on detecting the error, metadata associated with the packet,
wherein the metadata is determined based on the error causing the error rate to satisfy the threshold;
generate telemetry data to include the metadata; and
provide the telemetry data to a network analyzer for policy enforcement.

16. The non-transitory computer-readable medium of claim 15, wherein the second layer corresponds to at least one of:
a network layer, or
a transport layer.

17. The non-transitory computer-readable medium of claim 15, wherein the packet is determined to be associated with the error based on an error counter being incremented as the packet is processed through the second layer.

18. The non-transitory computer-readable medium of claim 15, wherein the metadata includes information from a header of the packet.

19. The non-transitory computer-readable medium of claim 15, wherein the metadata includes a header of the packet and at least a portion of a payload of the packet.

20. The non-transitory computer-readable medium of claim 15, wherein the metadata is determined based on information in a header of the packet.

* * * * *